Figure 1:
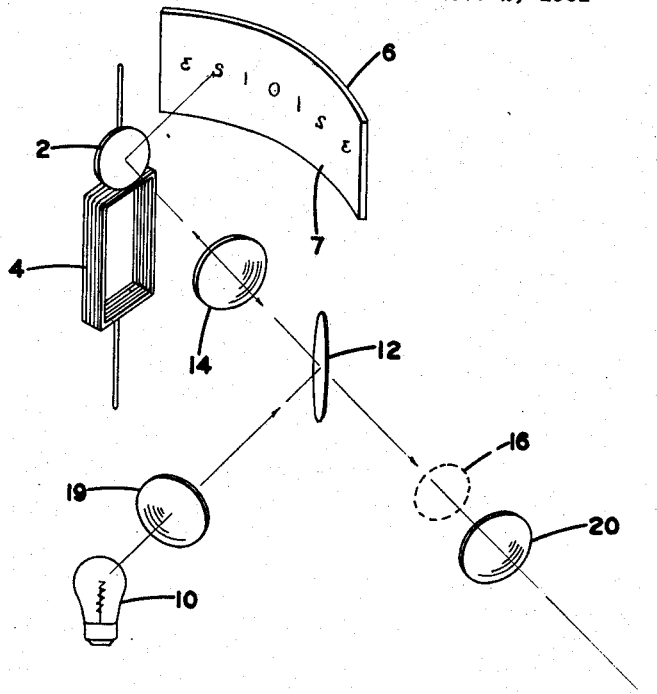

Dec. 17, 1963    L. O. VARGADY    3,114,284
OPTICAL SYSTEM FOR PROJECTION OF SCALE MEANS
Filed Nov. 2, 1961

INVENTOR.
LESLIE O. VARGADY
BY
ATTORNEYS

United States Patent Office

3,114,284
OPTICAL SYSTEM FOR PROJECTION OF SCALE MEANS

Leslie O. Vargady, Rochester, N.Y., assignor to Bausch & Lomb Incorporated, Rochester, N.Y., a corporation of New York
Filed Nov. 2, 1961, Ser. No. 149,646
5 Claims. (Cl. 88—24)

This invention relates to a novel optical system, and more particularly to a novel galvanometer read-out system including means for projecting a scale image onto a screen.

Optical read-out systems for use with galvanometers or the like for indicating angular displacements generally include a small mirror mounted in fixed relation to a movable element or coil. Any deflections of a light beam reflected from the mirror are observed to indicate changes in angular displacement. For example, such changes in a galvanometer would indicate changes in electrical values.

In systems of this type it is desirable to incorporate a cylindrical scale. Cylindrical scales are desirable since they indicate angular displacement instead of a tangent function indicated by a linear scale. The use of a cylindrical scale also facilitates maintaining the optical system in focus. For example, as a light beam moves along a linear scale it gets progressively further from or closer to the rotatable mirror and consequently requires a more complex optical system to keep the scale in focus over its entire length.

The use of cylindrical scales is particularly advantageous in systems which project a scale image onto a screen. Previous attempts along this line incorporate a transmissive scale and diascopic illumination. Illumination is provided over the entire length of the scale and it is relatively difficult to obtain relatively high intensity illumination at any particular portion of the scale.

An optical system according to the present invention overcomes to a high degree the limitations of conventional optical read-out systems. An image of a scale is projected onto a screen for indicating changes in angular displacement. The illumination brightness is improved by illuminating only a small portion of the scale. Illuminating a relatively small portion of the scale overcomes to a high degree the difficulty of illuminating the system.

The present system tends to improve accuracy and facilitates reading indicated changes. Such a system may incorporate a magnifying system for improving accuracy and further facilitating observation of any indicated changes. A magnifying system is particularly advantageous in situations where it is desirable to make numerous readings over a short time interval. In such cases the magnifying system reduces operator eye strain and therefore results in obtaining more dependable data.

The advantageous features of a device according to the present invention may be obtained at a relatively low cost. The device is relatively compact, relatively durable and is designed to reduce manufacturing difficulties and costs. Accordingly the present system incorporates several desirable features for galvanometer type instruments and yet maintains a cost advantage in a highly competitive commercial field.

Briefly, the present invention contemplates a novel read-out system for use in a galvometer or the like. The system incorporates a rotatable mirror generally similar to the type used in conventional galvanometers. A concave scale preferably having a cylindrical shape has a reflective coating on the concave surface. In the preferred embodiment the surface of the scale is defined by a line disposed parallel to the axis of the mirror and rotated about the axis with a constant radius. Means including a light source are incorporated to project a beam of light by way of the rotatable mirror onto the concave scale. The scale reflects the light impinging thereon back by way of the rotatable mirror to an image plane for indicating changes in the rotation of the rotatable mirror by imaging various sections of the scale. A screen may be placed at the image plane or an eyepiece may be arranged for viewing an aerial image formed in the image plane.

Figure 2:
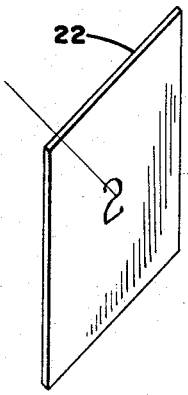
Figure 2:
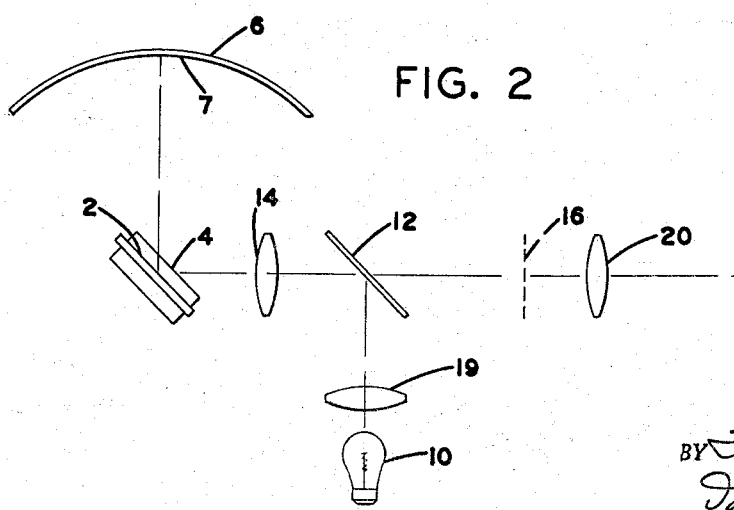

The invention will now be described in more detail in connection with the accompanying drawings; in which, FIG. 1 is a perspective view somewhat schematic of a novel optical system according to the invention; and, FIG. 2 is a side elevational view illustrating the optical system shown in FIG. 1.

A galvanometer read-out system according to the present invention includes a rotatable mirror 2 fixed to a rotatable member 4. The member 4 shown in FIGS. 1 and 2 is a moving coil of the type used in conventional galvanometers. A concave cylindrical scale 6 is arranged so that the radius of curvature is equal to the distance from the scale to the axis of rotation of the mirror, i.e. the origin of the generatrix lies on the axis of rotation. The front surface 7 of the scale has a reflective surface, i.e. a coating, polished metal, or a transparent scale with a reflective background. The latter is considered to be a reflective scale.

A light source 10 and a beam splitter 12 are arranged to project a beam of light onto the mirror 2. The light beam is reflected by the mirror 2 onto the cylindrical scale 6.

The reflective surface 7 of the scale 6 reflects the light beam back by way of the rotatable mirror 2 through an image forming element 14 through the beam splitter 12 to an image plane 16.

The primary purpose of the element 14 is to project an image of the scale to the image plane 16. The element 14 preferably a lens is also an integral part of the illumination system which produces optimum illumination of an area of the scale. In some cases it may be desirable to include a separate condenser lens 19. In such case the condenser lens 19 could be placed between the light source 10 and the beam splitter 12.

A projection lens 20 may be incorporated in the system for magnifying the image of the illuminated portion of the scale 6. An intermediate aerial image is formed at the first image plane 16 and the projected or magnified image is formed on the screen 22. In this case an intermediate aerial image is formed by the element 14. The intermediate image is projected through the lens 20 with the desired magnification onto the screen 22.

For practical purposes it has been found desirable to use a cylindrical scale, however the cylindrical scale may be replaced with a spherical scale without departing from the scope of the invention. It is envisioned that numerous changes and modifications may be made in the present system without departing from the spirit or scope of the appended claims.

What is claimed is:

1. An optical system for use with a measuring instrument comprising a rotatable mirror, a concave scale and an image plane, means including a light source for projecting a beam of light by way of said rotatable mirror onto said concave scale, said concave scale including a reflective surface for retrodirecting the beam of light, and an optical image forming element placed on the optical axis of the system between said scale and said image plane whereby light reflected by said concave scale by way of said rotatable mirror passes through said optical image forming element to thereby form an image of an illuminated portion of said scale at said image plane.

2. An optical system for use with a measuring instrument comprising a rotatable mirror, a concave cylindrical scale and an image plane, means including a light source for projecting a beam of light by way of said rotatable mirror onto said cylindrical scale, said cylindrical scale including a reflective surface for retrodirecting the beam of light, and an optical image forming element placed on the optical axis of the system between said scale and said image plane whereby light reflected by said cylindrical scale by way of said rotatable mirror passes through said optical image forming element to thereby form an image of an illuminated portion of said scale at said image plane.

3. An optical system for use with a measuring instrument comprising a rotatable mirror, a concave cylindrical scale and an image plane, the curved surface of said cylindrical scale being defined by a line parallel to the axis of said mirror and rotated about said axis with a constant radius, means including a light source for projecting a beam of light by way of said rotatable mirror onto said concave scale, said concave scale including a reflective surface for retrodirecting the beam of light, and an optical image forming member placed on the optical axis of the system between said scale and said image plane whereby light reflected by said scale by way of said rotatable mirror passes through said optical image forming element to thereby form an image of an illuminated portion of said scale at said image plane.

4. An optical system for use with a measuring instrument comprising a rotatable mirror, a concave cylindrical scale and an image plane, the curved surface of said cylindrical scale being defined by a line parallel to the axis of said mirror and rotated about said axis with a constant radius, means including a light source for projecting a beam of light by way of said rotatable mirror onto said cylindrical scale, a beam splitter placed on the optical axis of the system for directing the beam of light from the light source by way of said rotatable mirror to said cylindrical scale, said cylindrical scale having a reflective surface for reflecting the beam of light, and an optical image forming element placed on the optical axis of the systems between said rotatable mirror and said beam splitter whereby light reflected by said cylindrical scale by way of said rotatable mirror passes through said optical image forming element and said beam splitter to thereby form an image of an illuminated portion of said scale at said image plane.

5. An optical system for use with a measuring instrument comprising a rotatable mirror, a concave scale and an image plane, means including a light source for projecting a beam of light by way of said rotatable mirror onto said concave scale, said concave scale having a reflective surface for reflecting the beam of light, and an optical image forming element placed on the optical axis of the system between said scale and said image plane whereby light reflected by said concave scale by way of said rotatable mirror passes through said optical image forming element to thereby form an image of an illuminated portion of said scale at said image plane and a magnifying system placed on the optical axis of the system and arranged to project a magnified image of the illuminated portion of the scale onto the screen.

References Cited in the file of this patent

UNITED STATES PATENTS

| | | |
|---|---|---|
| 2,300,803 | Pattee | Nov. 3, 1942 |
| 2,615,367 | Murray et al. | Oct. 28, 1952 |

FOREIGN PATENTS

| | | |
|---|---|---|
| 504,610 | Italy | Dec. 13, 1954 |